United States Patent [19]
Boutmy et al.

[11] 3,985,963
[45] Oct. 12, 1976

[54] DEVICE FOR ENSURING IN AN INTERMEDIATE STATION THE TRANSFER AND THE BRANCH CONNECTION OF AT LEAST ONE MULTIPLEXED NUMERICAL DATA CHANNEL

[75] Inventors: Patrick Emile Boutmy, Lannion; Jean Gaston Walraet, Perros-Guirec, both of France

[73] Assignee: Societe Anonyme de Telecommunications, Paris, France

[22] Filed: Sept. 27, 1974

[21] Appl. No.: 509,967

[30] Foreign Application Priority Data
Oct. 3, 1973  France .............................. 73.35278

[52] U.S. Cl. ...................... 179/15 BD; 179/15 AF
[51] Int. Cl.² ...................... H04J 3/08; H04J 3/06
[58] Field of Search ......... 179/15 BD, 15 AL, 15 A, 179/15 AF

[56] References Cited
UNITED STATES PATENTS

| | | |
|---|---|---|
| 3,040,130 | 6/1962 | Hughes ........................... 179/15 BD |
| 3,600,519 | 8/1971 | McNeilly ......................... 179/15 AL |
| 3,838,416 | 9/1974 | Brown ............................. 179/15 BD |

Primary Examiner—David L. Stewart
Attorney, Agent, or Firm—Holman & Stern

[57] ABSTRACT

A device for ensuring in an intermediate station the transfer and the branch connection of at least one channel of plesiochronous numerical data multiplexed in accordance with a specific field of the transmission system, the intermediate station comprising a general emitting element provided with a clock and a general receiving element provided with a clock, said device comprising means for synchronizing in frequency and phase the clock of the general emitting element with the clock of the general receiving element, and an emitting path card which comprises a mixer whose first input terminal is fed by the signal of the information and justification bits and whose second input terminal is fed by the justification indication signal and whose output terminal, which is the output terminal of the path card, delivers a signal in which the first half of each bit is characteristic of the information and justification signal and the second half of the same bits is characteristic of the justification indication signal.

2 Claims, 6 Drawing Figures

DEVICE FOR ENSURING IN AN INTERMEDIATE STATION THE TRANSFER AND THE BRANCH CONNECTION OF AT LEAST ONE MULTIPLEXED NUMERICAL DATA CHANNEL

The present invention relates to a device for ensuring in an intermediate station the transfer and the branch connection of at least one of the channels of numerical data transmitted in the form of coded pulses multiplexed in accordance with a specific field of the transmission system.

It is known that n channels of individual transmission of plesiochronous numerical data around a velocity of A megabits/second and received at a terminal station, may be grouped and multiplexed by elements of the emitting part of this station in accordance with a time division field transmitted in line at a velocity of B megabits/second so that B > n A.

The principle of this numerical multiplexing has been described by Yvon MADEC in an article entitled "Equipment for numerical multiplexing" on pages 59–67 in the review "L'Echo des Recherches" of January 1973. It is explained in this article how in an element, termed emitting path, the signals contained in each one of the n channels, termed component signals, undergo a change of velocity of transmission from A megabits/second to B/n megabits/second. This leads to the filling of the time slots which have become free in each one of these component signals with bits termed "cramming" or "justification" bits and with justification indication bits which act to recognize the presence of the foregoing bits. These component signals, thus synchronized at B/n megabits/second, are thereafter multiplexed by a general emitting element which distributes them within a time field in which are formed the numerical filling bits namely:

the bits of the field locking signal,
the service bits,
the bits of justification indication,
the bits of the actual information, and
the justification bits.

The resulting signal, comprising successive fields thus constituted, is transmitted. In presently known devices, in an intermediate station certain component signals must be branched and others simply transferred. It is however necessary to reconstitute each one of the component signals in its initial form, that is to say with its transmission velocity of A megabits/sec. For this purpose, the receiving part of an intermediate station comprises a receiving junction, a general demultiplexing element, and as many receiving paths and emitting junctions as there are component signals. The emitting part comprises as many receiving junctions and emitting paths as there are component signals, a general multiplexing element and an emitting junction. The component signals which must be transferred inside the intermediate station are transferred by lines connecting the outputs of the emitting junctions of the receiving part with the corresponding inputs of the receiving junctions of the emitting part of this station.

An object of the present invention is to permit the transfer of one or a plurality of component signals in an intermediate station by employing less equipment which is cheaper than the known equipment.

Thus, the invention comprises equipping the general elements and the path cards of an intermediate station in such a manner that the output signal of the general receiving element is compatible with the output signal of an emitting path, that is to say, it may be fed, instead of the latter, into the input of the general emitting element with the same effect.

Also according to the invention, the general emitting element and the general receiving element of the same station are so connected that the field of the multiplexed signal emitted by said station is synchronized in frequency and phase with the field of the multiplexed signal received by this station.

In the device according to the invention, the emitting path card comprises a mixer whose first input terminal is fed with the signal of the information and justification bits whose second input terminal is fed with the justification indication signal and whose output terminal, which is the output terminal of the path card, delivers a signal in which the first half of each bit is characteristic of the information and justification signal and the second half of the same bit is characteristic of the justification indication signal.

Another feature of the device according to the invention is that in the general emitting element, the information and justification bits are read in the first half of the bits, whereas the justification indication bits are read during the second half of the last-mentioned bits.

Also according to the invention, in an intermediate station, the output terminals of the general receiving element, at which terminals is found a signal corresponding to each component signal, are, in the case of the transfer of the component signal, directly connected to the corresponding input terminals of the general emitting elements. In the case of a branch connection of said component signal, said output terminals of the general receiving element are connected to the corresponding input terminals of the receiving path cards.

The main advantage of the device according to the invention is therefore the reduction in the equipment of an intermediate station through which certain of the component signals must be simply transferred. Indeed, with respect to each transferred component signal, there is a saving comprising a receiving path card, a receiving junction, an emitting junction and an emitting path card. On the other hand, it is necessary in the device according to the invention to ensure the synchronization in frequency and phase of the clock of the general emitting element with the clock of the general receiving element. This synchronization is achieved by known means and its low cost does not detract from the advantages mentioned hereinbefore.

It is also arranged that, in the event of breakdown of the clock synchronizing system, the clock of the general emitting element continues to operate.

The invention will be understood from the ensuing description with reference to the accompanying drawings in which.

Figure 1:
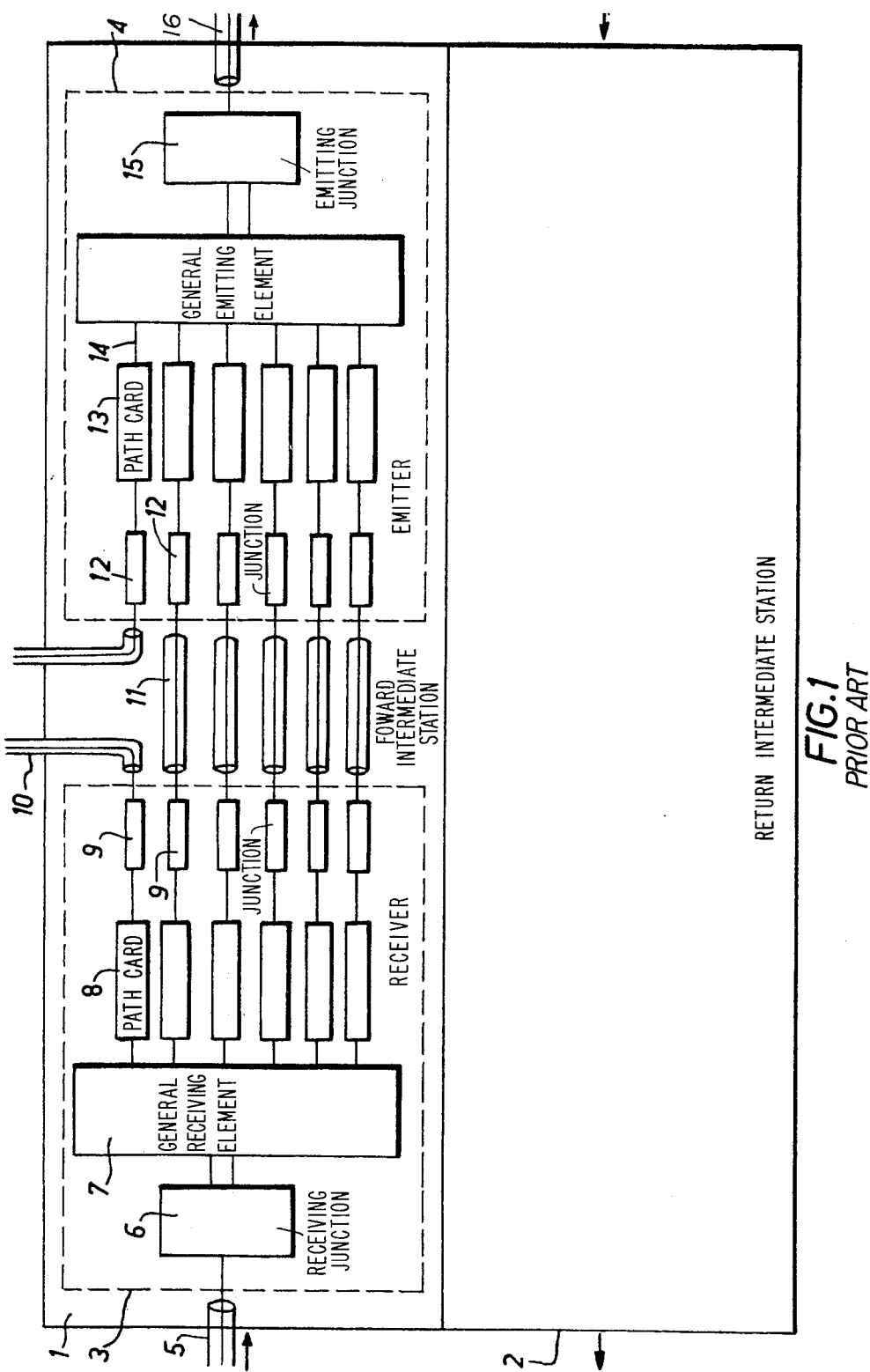
FIG. 1 is a block diagram of a known intermediate station.

FIG. 1 depicts a diagram of the equipment of an intermediate station according to a known device. This station is divided into two similar parts 1 and 2 each of which relates to one direction of transmission. The part 1, relating for example to the forward direction, comprises a receiving part 3 and an emitting part 4. The transmitted signal enters the station by way of the coaxial line or cable 5 whence it is received by the receiving junction 6. This junction is connected, possibly through a transcoder (not shown), to the general receiving element 7 which restores each one of the component signals. Each one of these signals is fed to one of the outputs of the general receiving element. These outputs, six in number in the presently described embodiment, are connected to the receiving path cards 8 which are connected to the receiving junctions 9. In the case of a component signal which must be branched, a coaxial line 10 connects the output of this junction 9 to the exterior of the station 1. In the more frequent case where the component signal must be simply transferred, another coaxial line, such as 11, connects the output of a receiving junction 9 to the input of an emitting junction 12. Each emitting junction, such as 12, is connected to a path card, such as 13, itself connected to the general emitting element 14. The output of this general emitting element 14 is connected, possibly through a transcoder (not shown), to the emitting junction 15 whose output terminal feeds the coaxial line 16 through which the resulting signal issues from the intermediate station. A similar arrangement is employed for the return direction of the same station. Depending on the station, the number of component signals which are branched and transferred may vary. The utilization of the process according to the invention is above all advantageous when most of the component signals are transferred.

Figure 2:
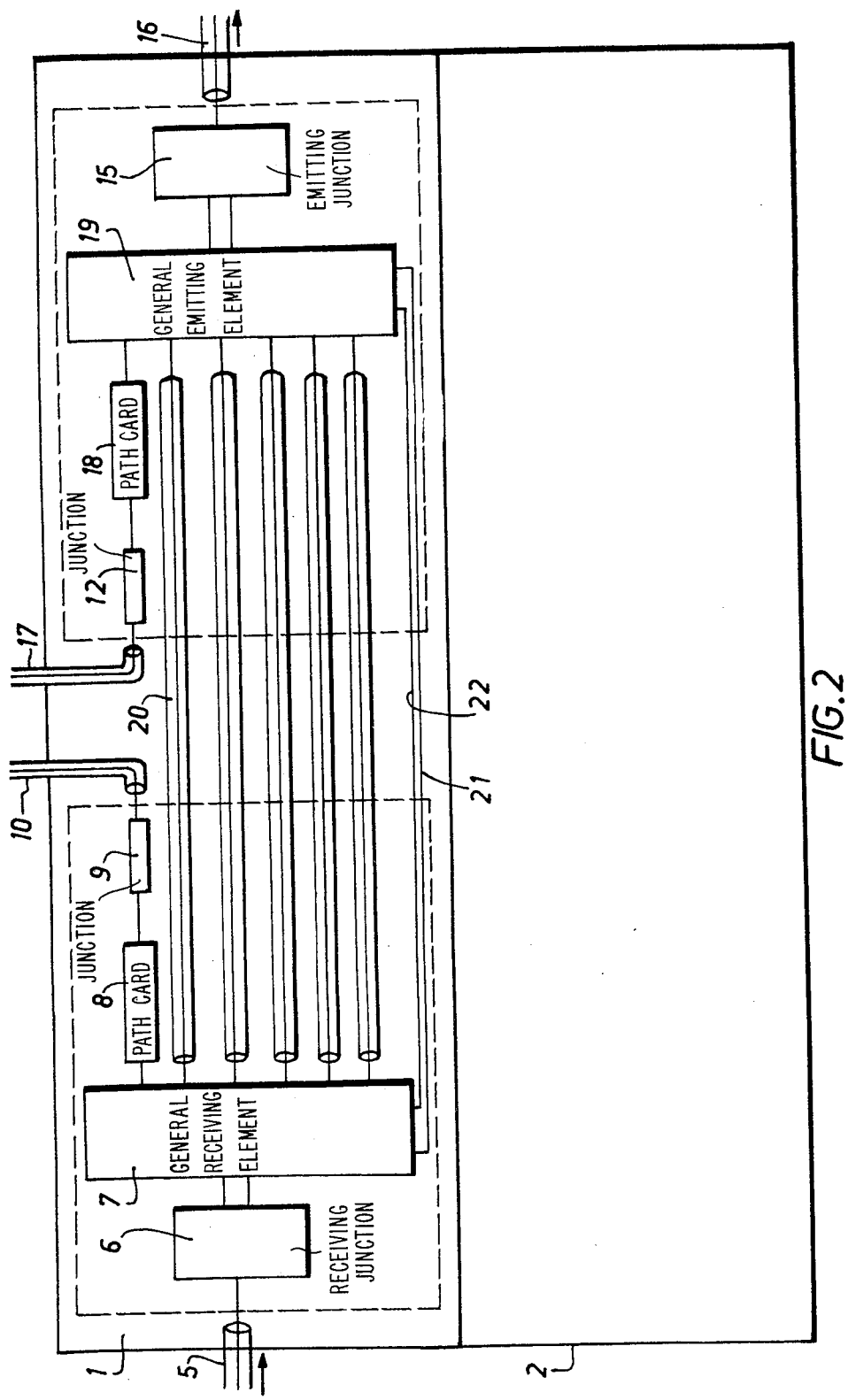
FIG. 2 is a block diagram of one embodiment of an intermediate station according to the invention.

FIG. 2 shows the diagram of the equipment of an intermediate station in accordance with the process of the invention. In this figure, there are shown the coaxial line 5, the receiving junction 6 and the demultiplexor means or general receiving element 7 followed solely, in the case of a component signal which must be branched, by a signal conditioning means or receiving path card 8, an emitting junction 9 and an output coaxial line 10. A new component signal may reach the intermediate station by way of the coaxial line 17. It is received by the emitting junction 12, followed by a signal conditioning means or emitting path card according to the invention 18, and the multiplexor means or general emitting element according to the invention 19. This new general emitting element is such that its input terminals may be directly connected to the output terminals of the general receiving element 7 through coaxial lines, such as 20, for all the terminals corresponding to the component signals which must be transferred. It will be understood that the time of propagation of the waves along the connections inside the intermediate station is taken into account.

Also shown in FIG. 2 are the two connections 21 and 22 required for the synchronization of the clock of the general emitting element 19 with the clock of the general receiving element 7.

Figure 3:
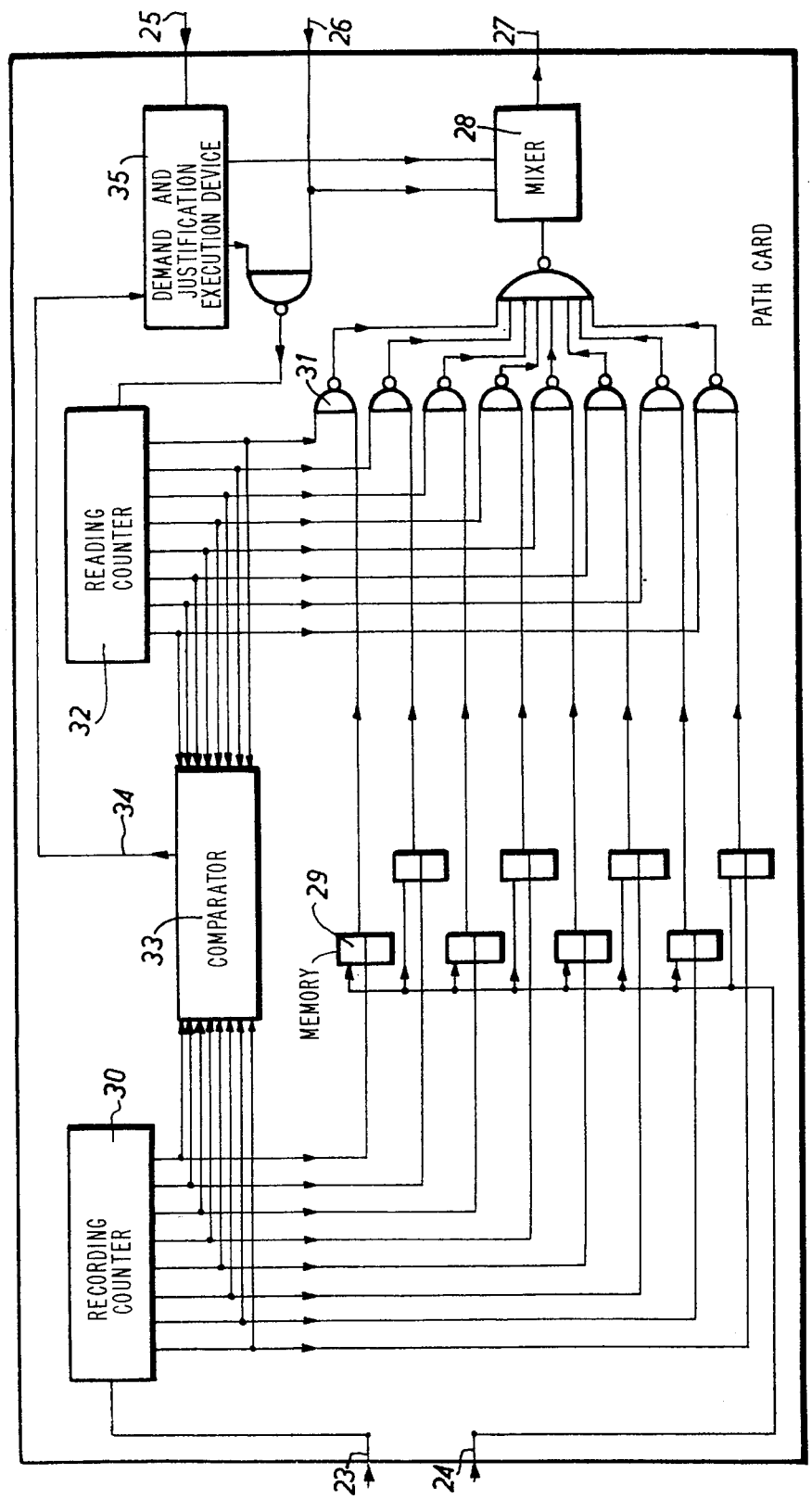
FIG. 3 is a diagrammatic representation of a path card according to the invention.

FIG. 3 shows diagrammatically the realization of a path card according to the invention. Such a card is connected through its input terminals 23 and 24 to the emitting junction which communicates thereto at 23 the rhythm frequency of A megabits/sec. and at 24 the component signal of a frequency of A megabits/sec. Through its input terminals 25 and 26 the card is connected to the general emitting element which communicates thereto at 25 the justification authorization signal and at 26 the signal controlling the reading register. At the output terminal 27 issues a signal of frequency $B/n$ megabits, each bit of which is, in its first half, characteristic of the information or justification signal, and, in its second half, characteristic of the justification indication signal. To obtain this characteristic in the output signal such a path card differs essentially from known path cards by the presence of a mixer 28. There are also found known elements such as the eight memories, 29, for recording the component signal at the velocity of A megabits/sec under the control of the recording counter 30, and eight gates 31 for reading the foregoing eight memories 29 at the velocity of $B/n$ megabits/sec under the control of the reading counter 32. The outputs of the two counters 30 and 32 are connected to a comparator 33 which is provided with abutments and whose output terminal 34 is connected to the demand and justification execution device 35.

Figure 4:
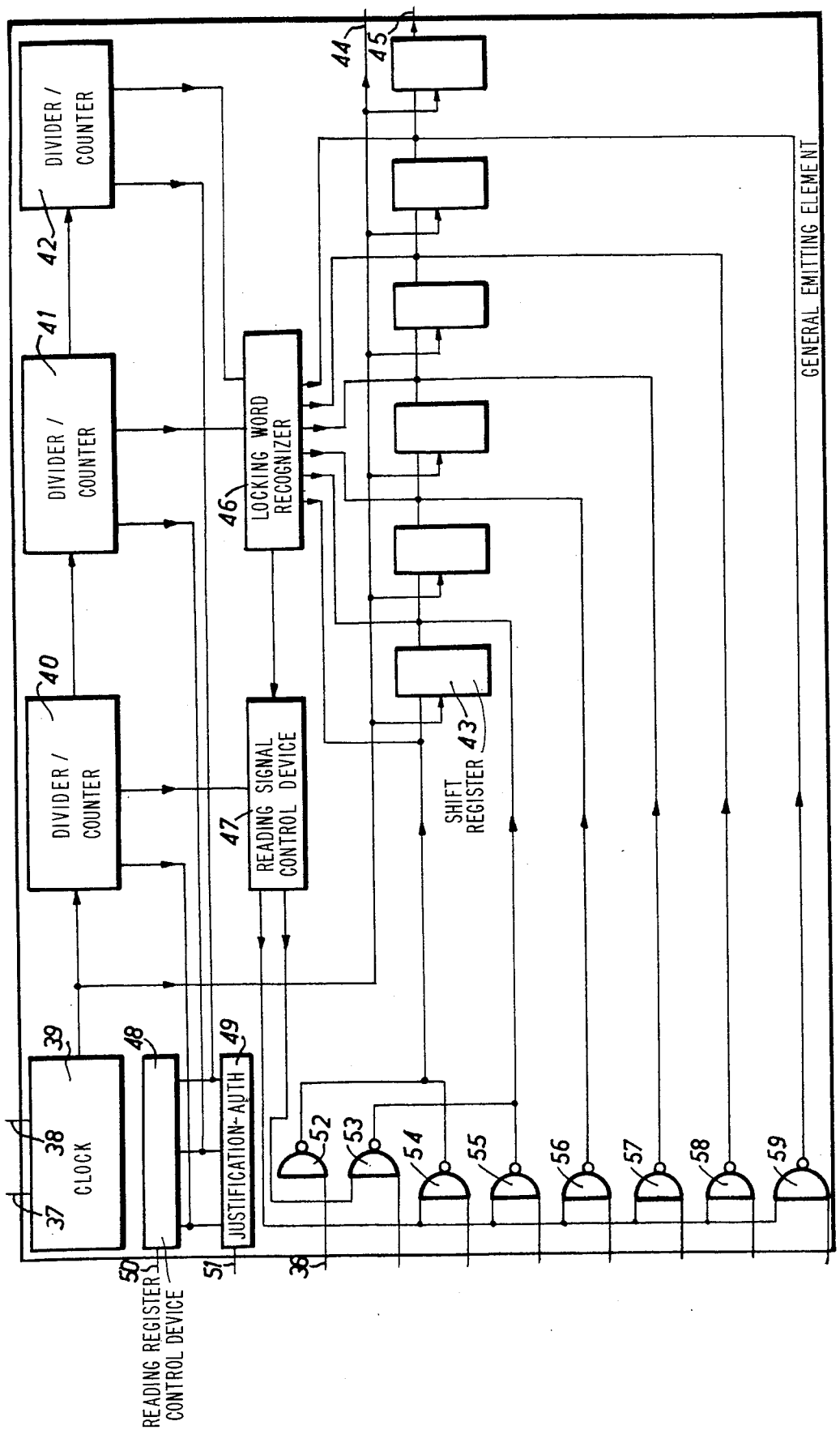
FIG. 4 is a diagrammatic representation of the general emitting element according to the invention.
Figure 5:
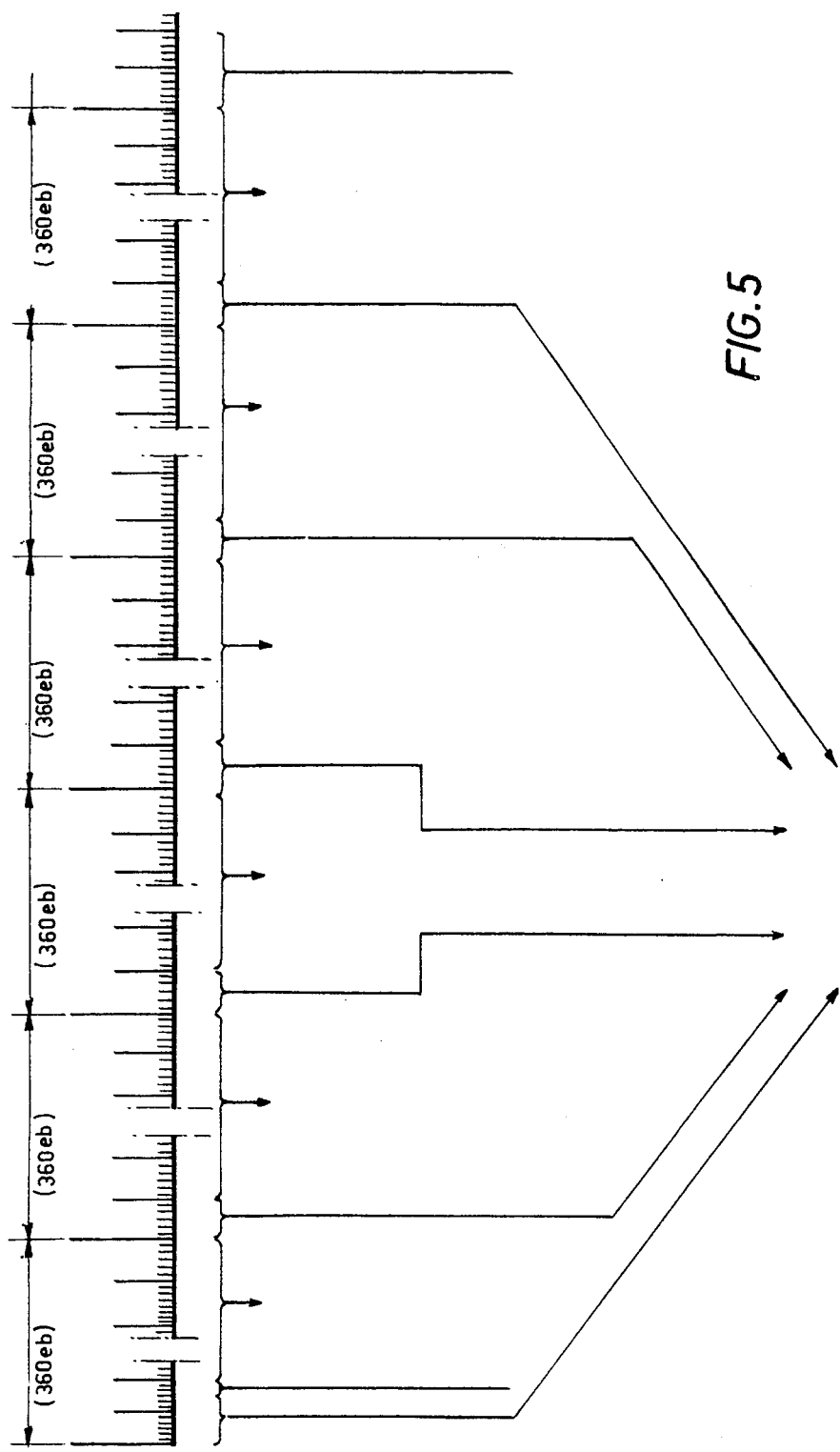
FIG. 5 shows a field having a time distribution.

FIG. 4 shows the diagram of the general emitting element according to the invention. In addition to the input terminals, such as 36, each of which receives the signal corresponding to each component signal, this general emitting element according to the invention has two input terminals 37 and 38 which are connected to two output terminals of the general receiving element of the same station for synchronizing the two clocks in frequency and phase. The clock 39 is connected to the terminals 37 and 38. It supplies the divider/counter system 40, 41, 42, the shift register 43 and the output terminal 44 of the general emitting element. The output terminal 45 of this general emitting element is also the output terminal of the shifting register, at which terminal there is received the signal resulting from the multiplexing of the component signals according to the time distribution field shown in FIG. 5.

The time dividing counter system 40, 41, 42 supplies the device for recognizing the locking word 46, the reading signal control device 47 and the reading register control device 48 and justification authorization control device 49 whose respective output terminals 50 and 51 are connected to the path cards. The reading control device 47 controls the opening of the gates 52 to 59 at the appropriate moments. The two gates 52 and 53 are, in accordance with a known method, reserved for the service bits and the six gates 54 to 59 are the gates relating to each one of the six component signals. According to the invention, the input terminals which correspond thereto, such as 36, may be connected either to a path card in the case of a component signal received directly by the intermediate station, or to an output terminal of the general receiving element in the case of a component signal simply transferred through the intermediate station.

Figure 6:
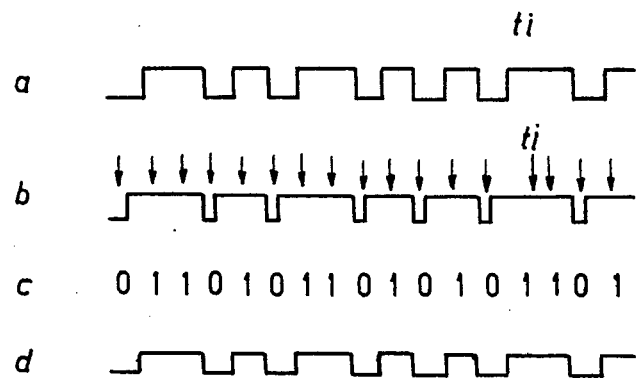
FIG. 6 shows signal diagrams.

There have been shown in the diagrams of FIG. 6 at a and b two examples of signals which may feed the gates 54 to 59. The diagram a represents a signal from the general receiving element, each bit being occupied uniformly by the value 0 or 1 given thereto either by the information or the justification or, for the particular bit at time $t_1$ by the justification indication. In this case, the message can therefore be read during any time within the duration of the bit. The diagram b represents a signal issuing from the path card according to the invention. To facilitate the understanding of the process according to the invention, this signal corresponds to the same portion of component signal. In this diagram b, each first bit half is significant of the information or justification signal and each second bit half is significant of the justification indication signal. It is clear that, provided the message is read at the instants indicated by the arrows in the diagram b, there is obtained the suite of 01 given by the diagram c and represented by the diagram d which is identical to the diagram a. The general emitting element according to the invention which reads the signal at the instants indicated by the arrows, can therefore receive indifferently and with the same result (diagram d) either the signal from the general receiving element (diagram a) or the signal from the path card according to the invention (diagram b).

What we claim is:

1. In a transmission system having an intermediate station which includes a general emitting element provided with a first clock and a plurality of input terminals and a general receiving element provided with a second clock and a plurality of output terminals, a device for ensuring the transfer and branch connection of at least one channel of plesiochronous numerical data multiplexed in accordance with a specific field of the transmission system, which comprises: means for synchronizing in frequency and phase said first clock with said second clock, a plurality of receiving path cards having input terminals and means connected thereto for effecting a branch connection of the component signal, certain of said output terminals of said general receiving element being connected directly to corresponding input terminals of said general emitting element for transfer of said component signal therebetween; certain of said output terminals of said general receiving element being connected to corresponding input terminals of said receiving path cards for a branch connection of said component signal; and an emitting path card connected to an input of the general emitting element, said emitting path card comprising a mixer having an output constituting the output of said emitting path card, a first input for receiving a justification indication signal and a second input for receiving the information and justification signal, said mixer being arranged to deliver a signal in which the first half of each bit comprises an information and justification signal and the second half of each bit comprises a justification indication signal.

2. The device as claimed in claim 1, wherein said general emitting element further comprises means for reading the information and justification bits during the first half of said signal and means for reading the justification indication bits during the second half of said signal.

* * * * *